United States Patent [19]
Clarke et al.

[11] Patent Number: 6,008,780
[45] Date of Patent: Dec. 28, 1999

[54] DIVER COMMUNICATION EQUIPMENT

[75] Inventors: Derek William Clarke, Aberdeen; Roger Brian Huxford, West Sussex; Arthur Graham Robinson, Newcastle Upon Tyne, all of United Kingdom

[73] Assignee: BG plc, London, United Kingdom

[21] Appl. No.: 08/564,040

[22] PCT Filed: Apr. 14, 1994

[86] PCT No.: PCT/GB94/00790

§ 371 Date: Mar. 28, 1996

§ 102(e) Date: Mar. 28, 1996

[87] PCT Pub. No.: WO95/28661

PCT Pub. Date: Oct. 26, 1995

[51] Int. Cl.[6] ................................................. G09G 5/00
[52] U.S. Cl. ...................................... 345/8; 349/11; 2/430
[58] Field of Search ................................ 345/8; 359/13, 359/630–633, 643; 349/11; 2/427, 434, 430

[56] References Cited

U.S. PATENT DOCUMENTS

| | | | |
|---|---|---|---|
| 2,909,959 | 10/1959 | Girden | 2/427 |
| 3,170,979 | 2/1965 | Baldwin et al. | 359/632 |
| 3,787,688 | 1/1974 | Stone | 250/214 VT |
| 3,892,234 | 7/1975 | Jones | 128/201.27 |
| 4,102,203 | 7/1978 | Sylvester et al. | 73/620 |
| 4,212,258 | 7/1980 | Collins | 114/312 |
| 4,257,691 | 3/1981 | Brooks | 351/158 |
| 4,269,476 | 5/1981 | Gauthier et al. | 345/8 |
| 4,502,407 | 3/1985 | Stevens | 114/222 |
| 5,033,818 | 7/1991 | Barr | 359/630 |
| 5,079,416 | 1/1992 | Filipovich | 250/214 VT |
| 5,079,753 | 1/1992 | Suggs | 367/107 |
| 5,089,914 | 2/1992 | Prescott | 359/815 |
| 5,353,054 | 10/1994 | Geiger | 348/81 |
| 5,420,828 | 5/1995 | Geiger | 367/131 |

FOREIGN PATENT DOCUMENTS

| | | |
|---|---|---|
| 0 007 432 | 2/1980 | European Pat. Off. . |
| 0011024 | 5/1980 | European Pat. Off. . |
| 0 213 890 | 3/1987 | European Pat. Off. . |
| 0408344 | 4/1992 | European Pat. Off. . |
| 2652658 | 4/1991 | France . |
| 2 097 147 | 10/1982 | United Kingdom . |
| 2 254 160 | 9/1992 | United Kingdom . |

OTHER PUBLICATIONS

Fifth International Conference On Advanced Robotics, Robots In Unstructured Environments, vol. 1, Pisa, Italy, pp. 1342–1347, Jun. 19, 1991.

*Primary Examiner*—Amare Mengistu
*Attorney, Agent, or Firm*—Larson & Taylor

[57] ABSTRACT

Diver communication equipment comprises a diver's helmet having a display consisting of a monitor, a prism, a relay lens and an eyepiece. The relay lens and the eyepiece are mounted in a tube which extends into the helmet through a sealing bush located in place by a nut. The helmet also caries a television camera and a light. By looking up at the eyepiece, the diver can see, through one eye, video images from the monitor derived from the camera or from another camera located topside of some other graphical or numeric information derived either from other devices subsea or other sources located topside. In a modification, the monitor occupies the tube.

21 Claims, 7 Drawing Sheets

DIVER COMMUNICATION EQUIPMENT

The invention relates to diver communication equipment.

Diver communication equipment has been proposed in patent specification U.S. Pat. No. 5,079,753 in which the diver's helmet was provided with a television camera, a light and a monitor. The monitor display could be viewed by the diver through an optical arrangement, including prisms, which arrangement could be folded out of the diver's view when not required. The optical arrangement obscured the diver's normal view when it was in use. The output from the camera could not be viewed by the diver but was passed to topside for viewing by diver support personnel. The information passed to the diver consisted of a sonar polar image derived from a sonar transducer hanging subsea from the diver support vessel. The output from the camera was used to observe the task faced by the diver.

Scuba diver communication equipment has been proposed in patent specification U.S. Pat. No. 5,033,818 in which a diver's mask was provided with an LED and the image from the LED was transmitted to the diver's eye by an optical system consisting of two plain mirrors. This did not obstruct the diver's vision along his normal straight-ahead direction. However, the optical system consisting of the two mirrors formed a virtual image at a distance greater than the accommodation distance so that the diver could focus on the displayed information. Furthermore, no monitor was provided by which the diver could receive video information.

None of the equipment described in the two specifications referred to above has a display means having magnifying power. By providing this, the invention enables a miniature monitor, packaged for subsea use, to be used comfortably by the diver to view video images, and also non-video images if desired.

Diver communication equipment, according to the invention, comprises a diver's helmet having a faceplate and display means carried by the helmet, said display means including means by which images can be created in response to an electronic input including a video input and an optical system for said image, said optical system including an eyepiece, locating means locating said eyepiece within said helmet behind said faceplate, said eyepiece having an output axis which is inclined to a vertical plane, and said optical system being effective to focus said image or images or an intermediate version thereof for a diverted eye of the diver.

In one form of equipment, said helmet having a through-aperture and being provided with seal means at said aperture, said locating means being a tube extending into the interior of said helmet, said seal means being in sealing relationship with said helmet and with said tube, said display means comprising a monitor mounted on said helmet in a horizontal, or near horizontal position and said optical system includes prism means by which light is deflected from an axis defined in a first direction by said monitor to an axis defined in a second direction by a relay lens system contained in said tube between said prism means and said eyepiece, said monitor, said prism means and said relay lens system being housed in a pressure-resistant housing, part of which is formed by said tube and which is closed at one end by said eyepiece.

In another form of equipment, said helmet having a through-aperture and being provided with seal means at said aperture, said locating means being a tube extending into the interior of said helmet, said seal means being in sealing relationship with said helmet and with said tube, said display means comprising a monitor and being contained in said tube which together with said eyepiece forms a pressure-resistant housing.

Embodiments of diver communication equipment will now be described by way of example with reference to the accompanying drawings in which.

BRIEF DESCRIPTION OF DRAWING

Figure 1:
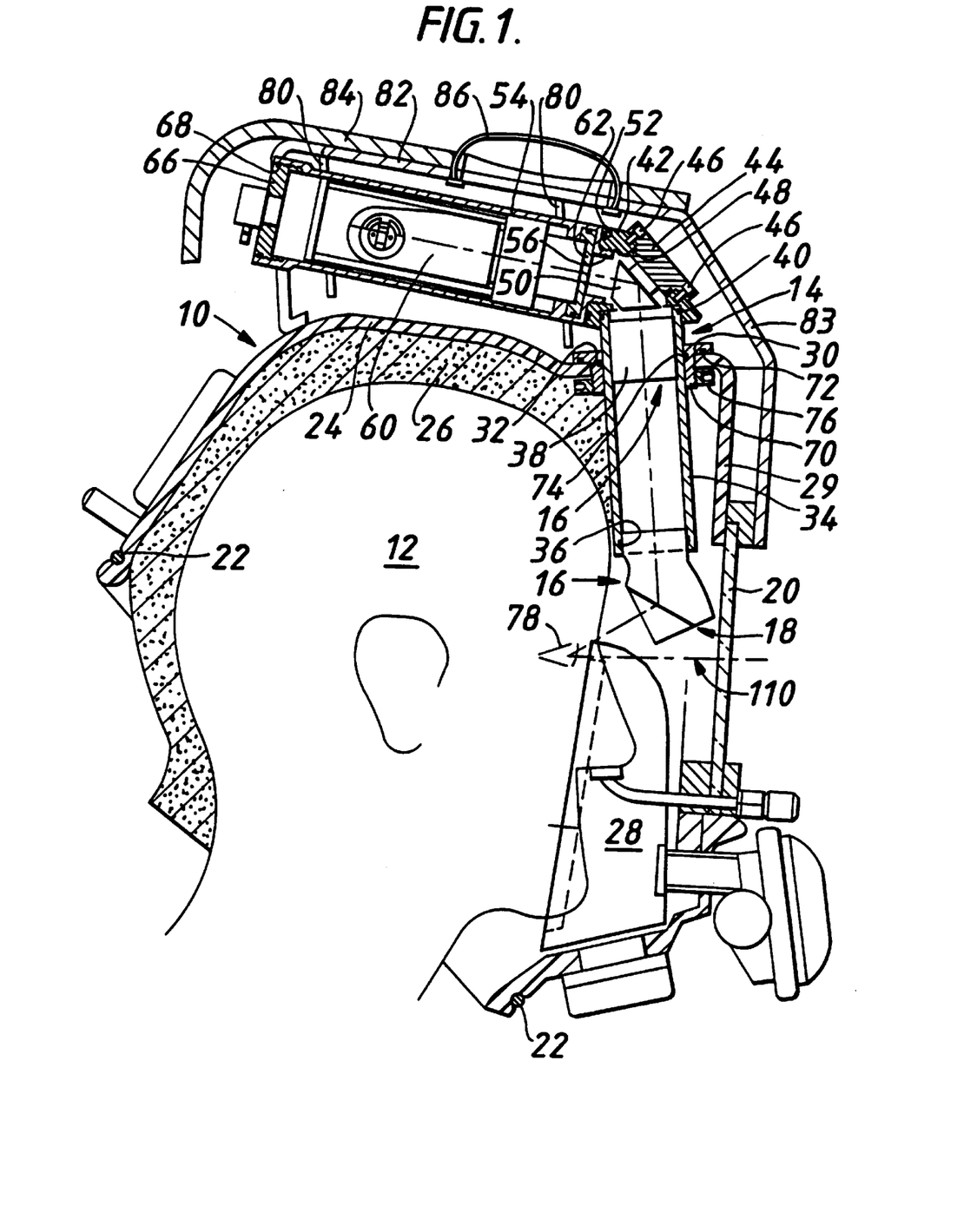
FIG. 1 is a vertical section through a first embodiment.

FIG. 1 shows diver communication equipment. The equipment consists of the following main components: a diver's helmet 10, the helmet 10 being shown as worn on the head 12 of a diver; a display means 14 carried by the helmet 10 including an optical system 16; an eyepiece 18 forming part of the optical system 16; and a faceplate 20 forming part of the helmet 10.

The helmet 10 is intended to be fitted to a diver's diving suit (not shown) and has sealing means 22 for that purpose. The helmet 10 consists of a glass and carbon fibre reinforced polyester shell 24 containing a padded liner 26 adapted to fit closely around the diver's head 12.

Within the helmet 10 there is an oral-nasal mask 28 through which the diver breathes. The mask 28 is connected by a hose (not shown) to a source of air or other gases, The standard helmet shell 24 immediately above the faceplate 20 has had a part removed and a part of modified part 29 (made of polyester) substituted in its place so as to provide a flat surface 30 at the top of the helmet 10 and a th rough-aperture 32 is formed in the flat surface 30. Through this aperture 32 an aluminium alloy tube 34 extends into the interior of the helmet 10. The lower end of the tube 34 carries the eyepiece 18, the upper periphery of which engages in sealing relationship a seal 36 located in an annular groove in the inside surface of the tube 34.

A relay lens system 38 is held within the upper end of the tube 34 by cement (not shown) and is in sealing relationship with the tube 34. The upper end of the tube 34 carries an external annular seal 40 in an annular groove in the outer surface of the tube 34. This seal 40 sealingly engages the circular surface provided by a circular hole in an aluminium alloy prism lens housing 42. This housing 42 has a cover 44 locked in position by screws 46 and carrying a seal 48 which sealingly engages the circular surface provided by a circular hole in the prism lens housing 42.

The cover 44 supports a pedestal which carries the prism lens 50.

The housing 42 also carries an annular face seal 52 around a screwed port. A further aluminium alloy housing 54 has a screwed spigot 56 which is screwed into the screwed port of the housing 54 and the adjacent end surface of the housing 54 sealingly engages the face seal 52. The housing 54 contains means in the form of a monitor 60 by which images can be created in response to an electronic input from a television camera described below. The housing 54 is closed at one end nearer to the prism lens by a transparent window 62 having an annular edge seal 64 which sealingly engages the inner surface of the housing 54. The other end of the housing 54 is closed by an end wall 66 screwed into the end of the housing 54 and carrying an annular edge seal 68 which sealingly engages the housing 54.

The tube 34 and each housing 42, 54 is a pressure resistant housing and the three combine together to present a pressure resistant unitary housing for the display means 14 and the optical system 16 contained within it.

The helmet 10 is pressure compensated and is sealed and in order to preserve that property of the helmet 10, the tube 34 has seal means surrounding it at the aperture 32. The seal means consist of a sealing bush of synthetic plastics material 70 surrounding the tube 34 and fitting within the aperture 32 and having an annular face seal 72 located in a groove and sealingly engaging the flat surface 30 of the helmet 10. The sealing bush 70 also has an annular seal 74 located in a groove in the bore of the sealing bush 70 and sealingly engaging the outer surface of the tube 34.

The tube 34 can slide lengthwise through the seal 74 for adjustment purposes explained further below.

The sealing bush 70 within the helmet 10 has a screwed outer surface which carries a screwed aluminium alloy locking nut 76 and which can be tightly screwed up against the helmet shell 24 and so cause the seal 72 to sealingly engage the flat surface 30 at the outside of the helmet shell 24 and so maintain the pressure resistant integrity of the helmet 10.

In the course of assembly of the helmet 10, the sealing bush 70 is pushed onto the tube 34 and the eyepiece 18 is assembled with the tube 34 and the tube 34 is assembled with the prism lens housing 42 and the monitor housing 54. The combined housing is then brought into juxtaposition with the shell 24 and the tube 34 is inserted through the aperture 32. Finally, the locking nut 76 is screwed home on the sealing bush 70.

As shown in this embodiment, the position of the tube 34 can be adjusted so as to adjust the position of the eyepiece in relation to the diver's eye 78 (in this case his right eye). The combined housing made up of the tube 34 and the housings 42 and 54 can be slid up and down on rails 80 which are fastened to a mounting bracket 82 secured to the top of the helmet 10. The housing can be locked (to lock the position of the tube 34) by locking means (not shown) acting on the rails 80, whatever the position into which it is adjusted. It is optional whether such adjustment is provided. In other embodiments the tube 34 may be locked in one position. The rails 80 prevent rotation of the tube 34 about its longitudinal axis.

Figure 3:
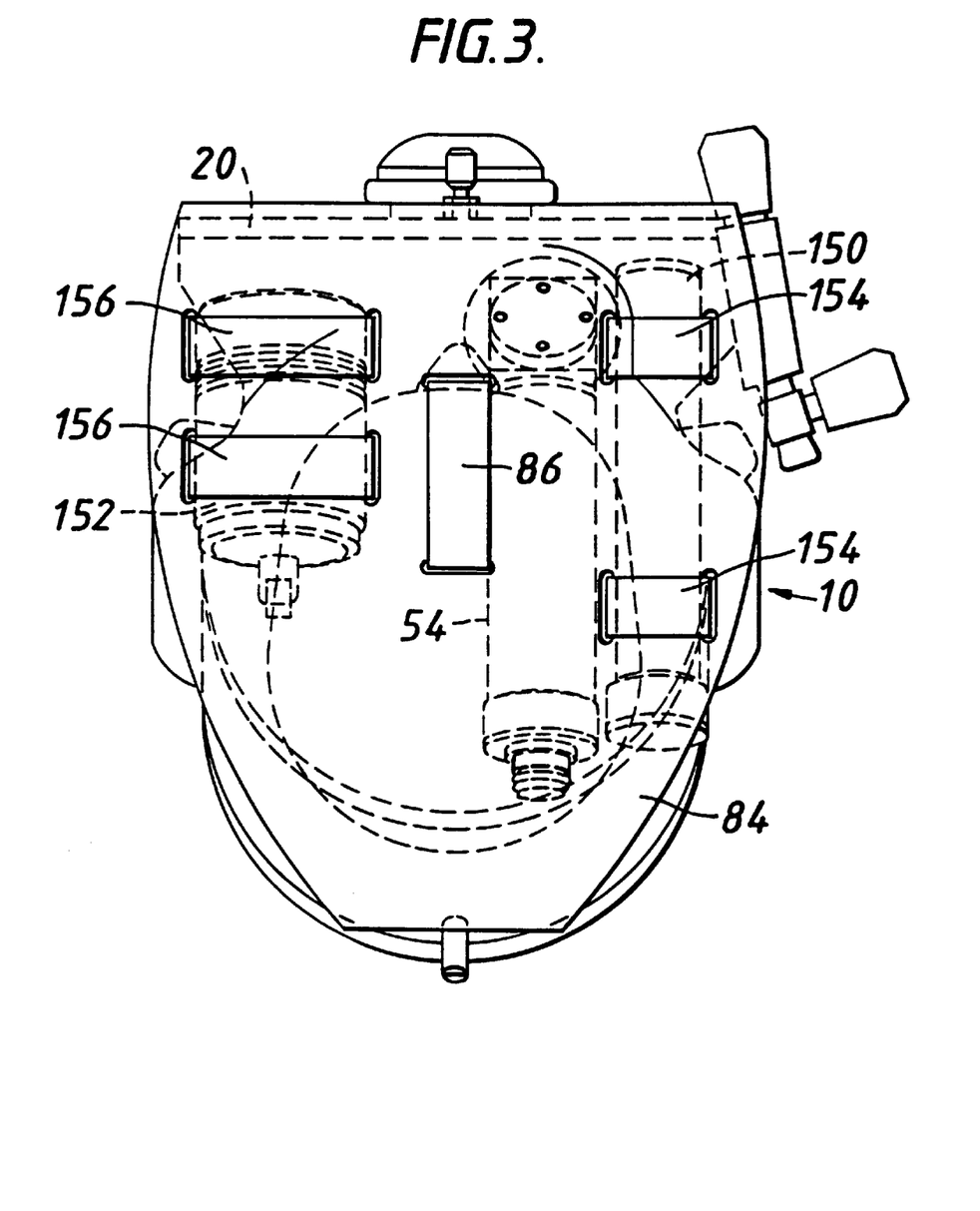
FIG. 3 is a plan looking down on the top of the equipment shown in FIGS. 1 and 2.

A protective glass-reinforced resin cover 84 is mounted on the bracket 82 and the bracket 82 and the protective cover 84 are apertured to provide access for fingers during handling of the helmet 10, a carrying handle 86 being retractably provided bridging the aperture. The bracket 82 is of restricted width at the front of the helmet 10, in the region 83, and so does not obstruct the television camera and the light which are mounted beneath the cover 84 and are shown in FIG. 3. This is shown more fully in FIG. 4.

The eyepiece 18 is positioned relatively close (approximately 40 m) to the diver's eye 78 (in this embodiment the right eye) so that only the peripheral vision of that eye in the sector of the eyepiece is obscured. (ignoring the obstruction afforded by the remainder of the helmet 10). The normal view which is available to the diver keeping his eyes horizontal is not restricted and the fact that the other eye (in this case the left eye) is hardly obstructed so far as peripheral vision is concerned means that the obstructing effect of the eyepiece is minimal. The eyepiece 18 is positioned such that its lower edge has slight separation from the line 110 of the axis of the eye 78 when it is in the horizontal position. That separation is sufficient to allow both eyes, when in the horizontal positions, to receive unobstructed the light corresponding to direct (ie. non-peripheral) vision.

The diver must deflect his eyes upwardly (in this example by 30°) in order to view the display presented by the eyepiece 18 and to receive the light emitted by the eyepiece along the upwardly deflected principal axis of the eye 78.

The remarks made in the two preceding paragraphs concerning the positioning of the eyepiece also apply to the second embodiment of equipment which uses the slightly modified optical system described with reference to FIG. 2 below.

Figure 2:
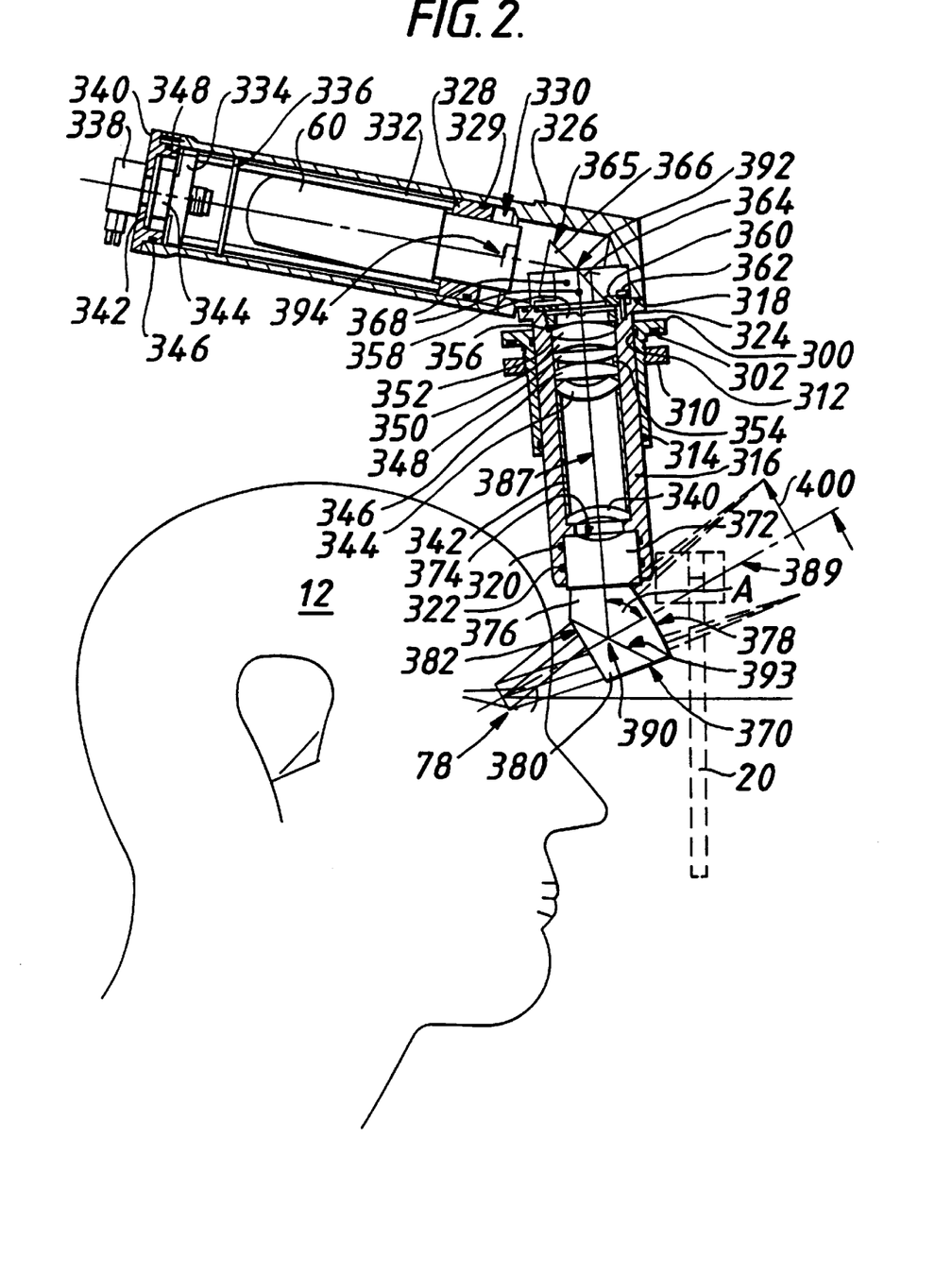
FIG. 2 is a vertical section through a second embodiment, shoving an optical system used in the helmet shown in FIG. 1.

FIG. 2 shows a second embodiment of equipment. The helmet 10 is the same but the detail of construction of the optical system is different.

A collar 300 replaces the bush 70 and it is retained in the through-aperture 32 in the helmet 10 by a locking ring 310. The collar 300 has at its upper end a flange, which carries an O-ring seal 302 in its underside which is intended in use to engage the flat upper surface of the helmet 10 surrounding the aperture 32. The collar carries internal O-ring seals at 312, 314 which engage the outer surface of an aluminium alloy tube 316. The tube 316 carries an O-ring face seal 318 at its upper end and carries two internal O-ring seals 320, 322 at its lower end.

The upper end of the tube 316 has a rectangular flange 324 with the seal 318 in its upper face. The flange 324 is secured to a matching rectangular opening in an aluminium alloy housing 326 which is machined from a solid aluminium alloy bar. The flange 324 is secured in place by four screws (not shown).

The housing 326 contains the monitor 60, which is modified by having the viewfinder removed. The monitor 60 is retained in a ring 328 which carries an external O-ring 329 supported by the internal surface of a bore 330 machined in the bar of the housing 326. The ring 328 is connected by rails 332 to a bulkhead 334. The rails 332 support a printed circuit interface 336.

An electrical connector 338 is fitted through a clearance hole in a closure 340 for the housing 326. The connector 338 is retained by a washer 342 and a nut 344 inside the closure 340. The closure 340 has an external O-ring seal 346 engaging the inside surface of the bore 330 and the closure 340 is retained in place by screws 348.

The bulkhead 334 is supported on the remaining threads of the connector 338. The exact position of the monitor 60 can be adjusted by rotating the bulkhead 334. The final orientation of the monitor 60 is adjusted by rotating the monitor 60 within the bulkhead 334, which acts as a clamp and uses the O-ring 329 as a clamping support.

The tube 316 contains a series of lenses forming a relay system. Starting at the lower end of the tube 316 there is a lens 340 which is supported against an internal shoulder formed on the tube 316. The lens 340 in turn supports a spacer tube 342. The tube 342 supports at its upper end lenses 344, 346, 348, 350 and 352. The lens 346 and 348 are separated at their outer peripheries by a spacer ring 354. The uppermost lens 352 is supported by an O-ring 356 held in place by an internal clamping ring 358, which has an external thread screwed into a screw-threaded upper end of the tube 316.

The upper end of the tube 316 carries a mounting plate 360 held in place by screws 362. The plate 360 includes two upwardly-extending lugs 364. Between these lugs 364 is retained a prism 366, which is held in place by screws 368, and rubber potting compound (not shown).

The lower end of the tube 316 is closed by an eyepiece 370, the upper end of which is a cylindrical first part 372 of a three-part assembly forming the eyepiece 370 and which is retained in the tube 316 by engagement with the O-rings 320 and 322 and locking screws (not shown). The upper surface 374 of the part 372 is concave.

The housing 326 in combination with the tube 316 provides a housing which is pressure-resistant. The housing 316, 326 is closed at one end by the closure 340 and the electrical connector 338. At the other end, the housing is closed by the eyepiece 370. The vertical position of the housing can preferably be adjusted in a manner similar to that described for the first embodiment. The housing 326 can be slid up and down on rails (not shown) which are mounted on top of the helmet 10. The tube 316 slides up and down correspondingly through the seals 312 and 314. Means (not shown) are preferably provided for locking the housing in any particular adjusted position.

The second part 376 of the eyepiece 370 has a mirror surface at 378 and the part 376 is joined to the third part 380 of the eyepiece 370 which is a prism and which has a plane face 382, which is angled to the eye 78 of the wearer 12 of the helmet 10. The angle A between the axis 387 of the relay system and the axis 389 of the upwardly deflected eye is 65°.

The axis 387 of the optical system in the tube 316 is displaced clockwise through 5° from the vertical. The diver must deflect his eyes upwardly through 30° to view the display presented by the eyepiece 370. These angles are prefer red in this embodiment but may be different in other embodiments.

The relay system has a length, measured between the intersection of the eye axis and the relay axis 390 and the intersection of the relay axis and the monitor axis 392, of 150 millimetres. The radius of curvature of the mirror surface 378 is 99.89 mm.

The common surface at 393 is a semi-reflecting surface. Light from the relay system is reflected at this surface, then is reflected at the mirror surface 378 and then the light travels back through the surface 393, through the third part 380 and thence to the eye 78.

In assembling the optical system to the helmet, the collar 300 is fitted to the tube 316 (which is assembled with the monitor housing 326). The eyepiece 370 is fitted in the lower end of the tube 316, which of course is complete with the relay system inside it. The whole is assembled into the helmet 10 and the locking ring 310 is assembled onto the collar 300 and tightened against the underside of the helmet 10. The locking ring 310 has radial holes to receive a tool to facilitate final tight assembly with the helmet 10.

The final image 400 seen by the wearer 12 is a virtual image produced by the relay system and the eyepiece 370. The final image 400 is produced by the relay system and the eyepiece from the real image 394 produced by the monitor 60. The final image 400 is ten times the image 394. The final image is upright.

The optical system shown in FIG. 2 is a monocular system (as is the system shown in FIG. 1) and light from the monitor is deflected by the face 365 of the prism 366. There is total reflection of light at this face 365. The light then enters the relay system contained in the tube 316. The eyepiece 370 shown in FIG. 2 is called a retro-reflecting eyepiece.

A branch pipe leading from the fogging tube (already provided in the helmet to prevent fogging of the faceplate 20) has an exit positioned so as to direct air past the plane face 382 to prevent fogging of the face 382.

The monitor 60 used in this embodiment is one available from Simrad Osprey Limited, Aberdeen, Scotland. The monitor measures 35 mm by 30 mm by 110 mm and as packaged in a housing for underwater use the overall dimensions are length (excluding connector) 147.5 mm; diameter (at the window end) 45 mm; and diameter (at the connector end) 48 mm. The weight of the monitor in air is 300 grams and in water it is 70 grams. The face size is 8 mm by 10.7 mm. The potential resolution is 400 TV lines.

In this embodiment the eyepiece provides a field of view of 18.2° vertical; 24.2° horizontal and 29.9° diagonal. The eye relief is 40 mm and the pupil diameter is 12 mm.

The field of vision could be increased and the magnification improved by 5%–10% by curving the face 382. This would help to maintain the prism dimensions and retain the 40 mm eye relief.

All of the optics are contained in the same area and can be aligned and tested before they are mounted in the helmet.

The design targets aimed at in this embodiment are:

| Monitor Characteristics: | |
|---|---|
| Resolution | 400 TV Lines |
| Screen Size | 10.7 mm × 8.0 mm |
| Display Optics: | |
| Magnification | X7 to X11 |
| Field of View X7 mag: 17.0° Horizontal 21.2° Diagonal | 12.8° Vertical |
| Field of View X11 mag: | 20.0° Vertical 26.5° Horizontal 32.8° Diagonal |
| Eye Relief | 35 mm min |
| Pupil Diameter | 12 mm min |
| Chromatic Correction | 480 nm to 660 nm |
| Resolution | 70% contrast at 25 lp/mm |
| Field Curvature | Less than 0.5 Dioptres |
| Line of Sight | +30° "Look Up" display |

FIG. 3 is plan of the equipment shown in FIG. 1 looking down on the equipment. If the embodiment shown in FIG. 2 were used, the corresponding plan view would be very similar. This view shows a miniature television camera 150 and a viewing light 152 mounted beneath the protective cover 84 and are packed for underwater use. The camera 150 and the light 152 are supported beneath the cover 84 by straps 154 and 156, respectively.

The television camera is a product available from Simrad Osprey Limited and provides an electronic input to a monitor located topside, and to the monitor 60 on the diver's helmet 10. Images are created by the monitors from that input.

As packed for subsea use the housing containing the camera is 198.1 mm long. It has a diameter of 38.1 mm and an enlargement to the diameter at the right hand end measuring 45 mm. The camera in its packaged form weighs 450 grammes in air and 220 grammes in water.

The light is a videolight made by Remote Ocean Systems and available from Bowtech Products Limited, Robert Leonard Centre, Kirkhill Industrial Estate, Dyce, Aberdeen, AB2 OES. As packaged for subsea use, the light is in a housing which measures 165 mm long and 50.8 mm in diameter. The light operates at 120 volts and consumes 250 watts.

Figure 4:
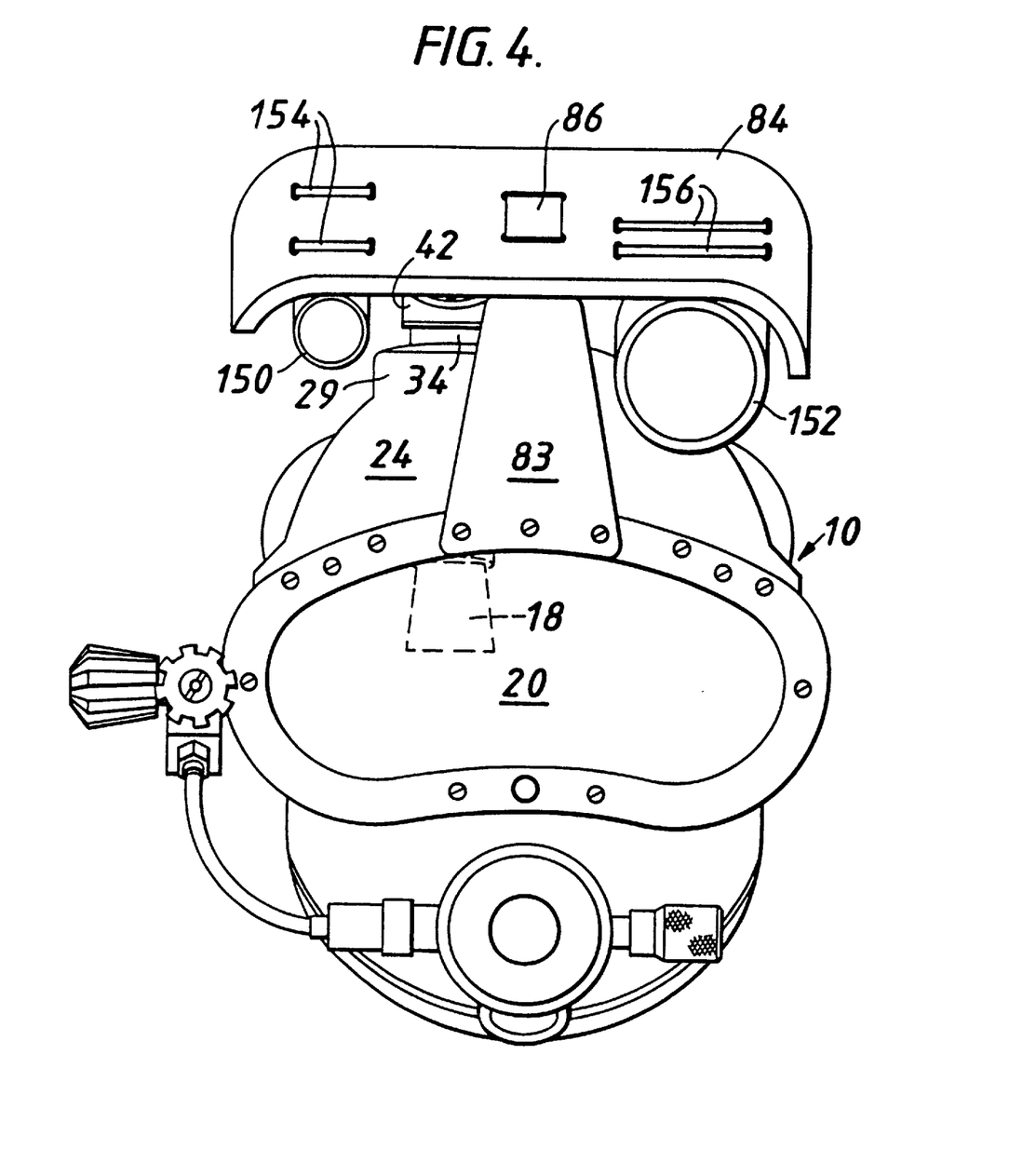
FIG. 4 is an elevation of the embodiment shown in FIGS. 1 to 3 from the front.
Figure 5:
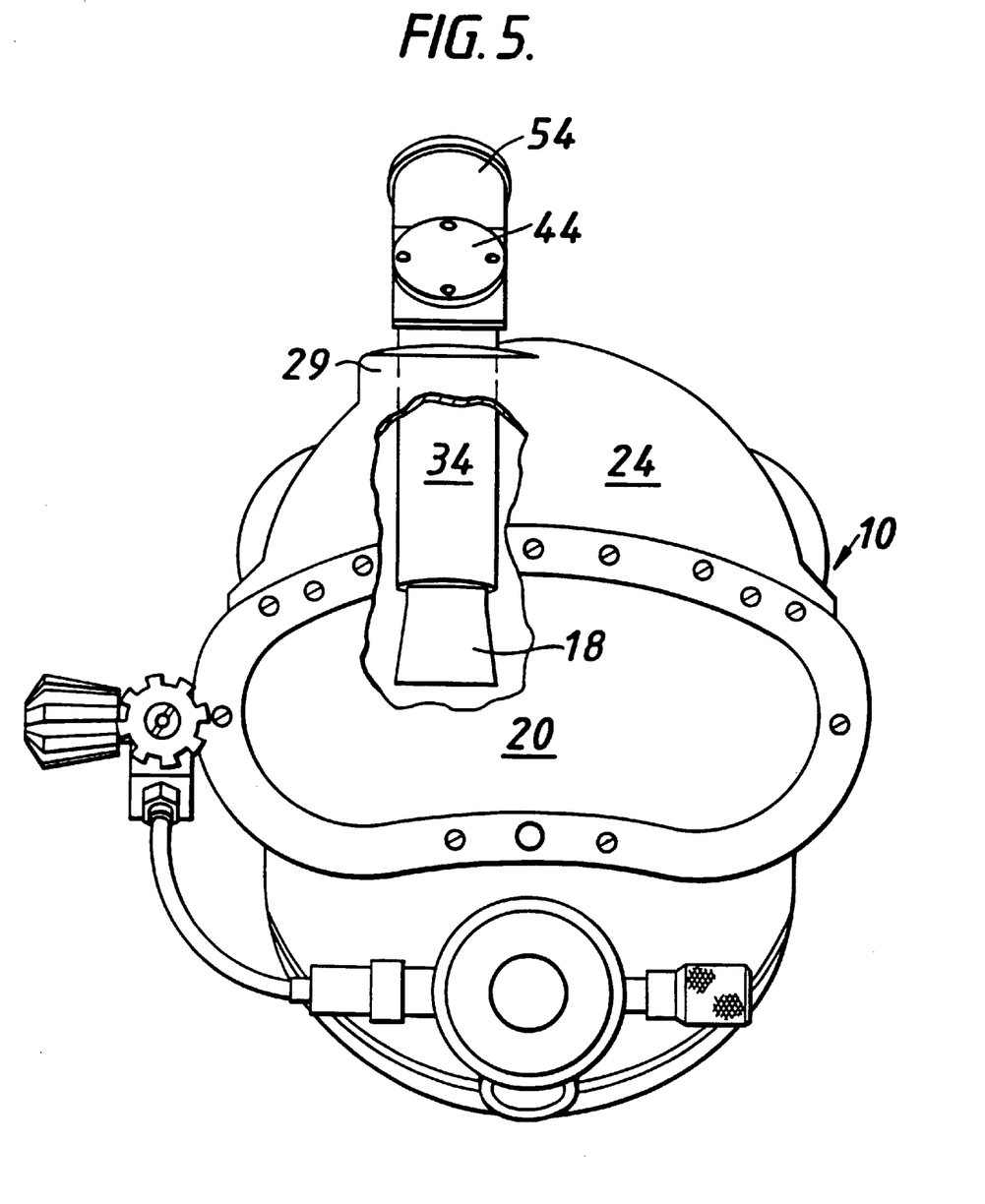
FIG. 5 is an elevation similar to FIG. 4 but with the cover removed from the top of the helmet and with part of the helmet shown cut away.

FIGS. 4 and 5 show views of the equipment in the first embodiment form of FIG. 1 from the front and a similar view but with the protective cover 84 removed for clarity. The corresponding views if the embodiment shown in FIG. 2 were used would be very similar. FIG. 4 clearly shows the restricted width of the part 83 of the bracket 82 so that the television camera 150 and the light 152 are not obstructed by the bracket 82.

Figure 6:
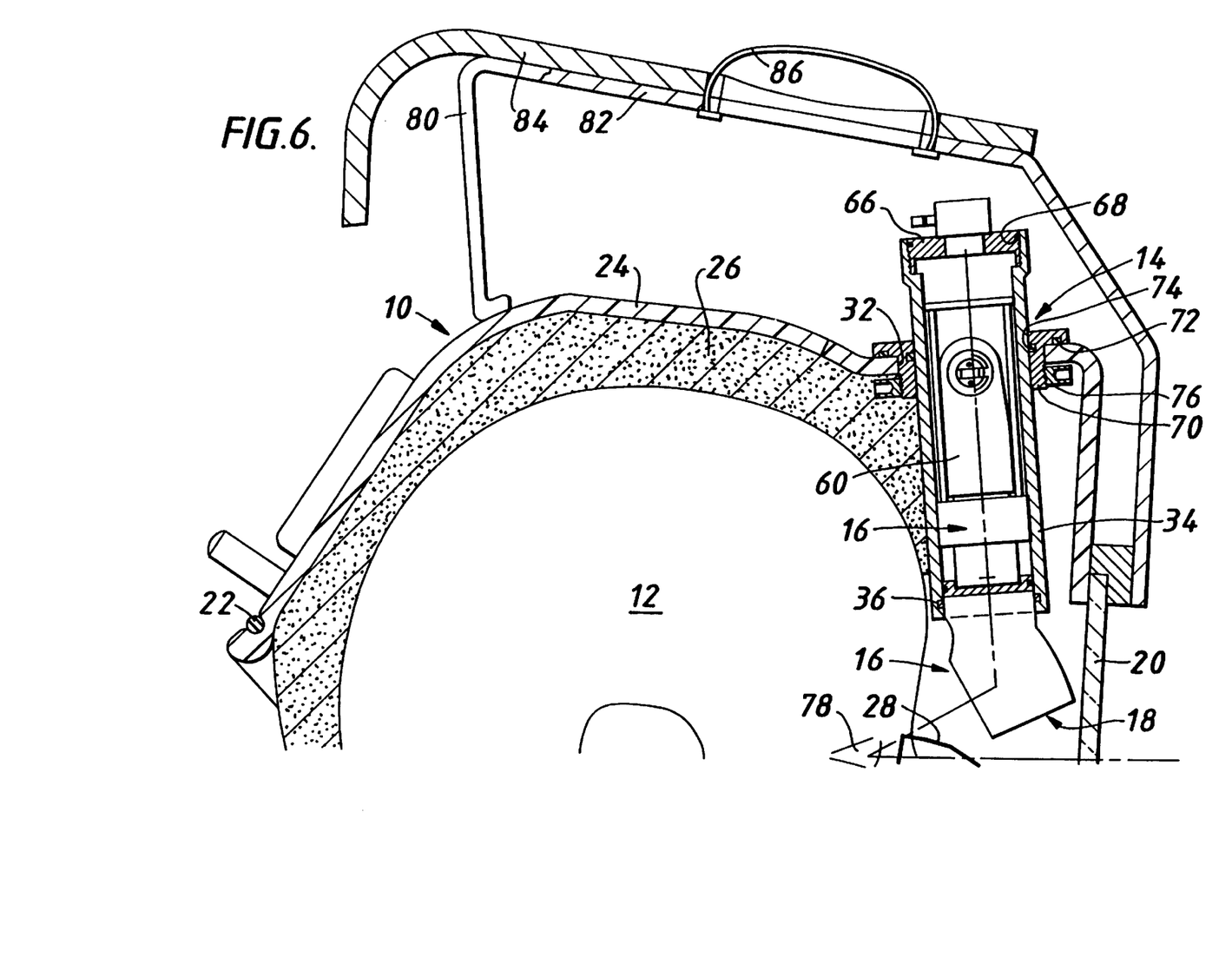
FIG. 6 is a vertical section through a third embodiment of equipment.

FIG. 6 shows a vertical section through part of a third embodiment of equipment, the omitted part being identical with the embodiment shown in FIG. 1. The same reference numerals are used in FIG. 3 as used in FIG. 1 for the same components.

In this embodiment, the monitor 60 is slightly smaller than that shown in FIG. 1 and is housed in the tube 34 instead of being mounted on top of the helmet 10. The eyepiece 18 receives the image produced by the monitor 60 directly. No relay lens is used. The resulting magnification is now ×6 instead of ×10 as achieved by the embodiment shown in FIGS. 1 and 2.

A television camera and a light are supported beneath the cover 84 in the same manner as shown in FIG. 3.

In other embodiments (not shown) the monitor is mounted in some other position to those shown in FIG. 1, FIG. 2 and FIG. 4. For example, the monitor can be mounted on the helmet to one side, the monitor extending lengthwise in the direction of the paper in FIG. 1 or FIG. 2 and the remainder of the display means (including a relay lens) extending into the interior of the helmet through a through-aperture in the side of the helmet. This would give a magnification the same as the embodiment shown in FIGS. 1 and FIG. 2.

In yet another embodiment, the monitor would be similar to that used in the embodiment shown in FIG. 6 but would enter the helmet through a through-aperture in the side of the helmet. No relay lens would be used and the magnification would be the same as the embodiment shown in FIG. 6.

Figure 7:
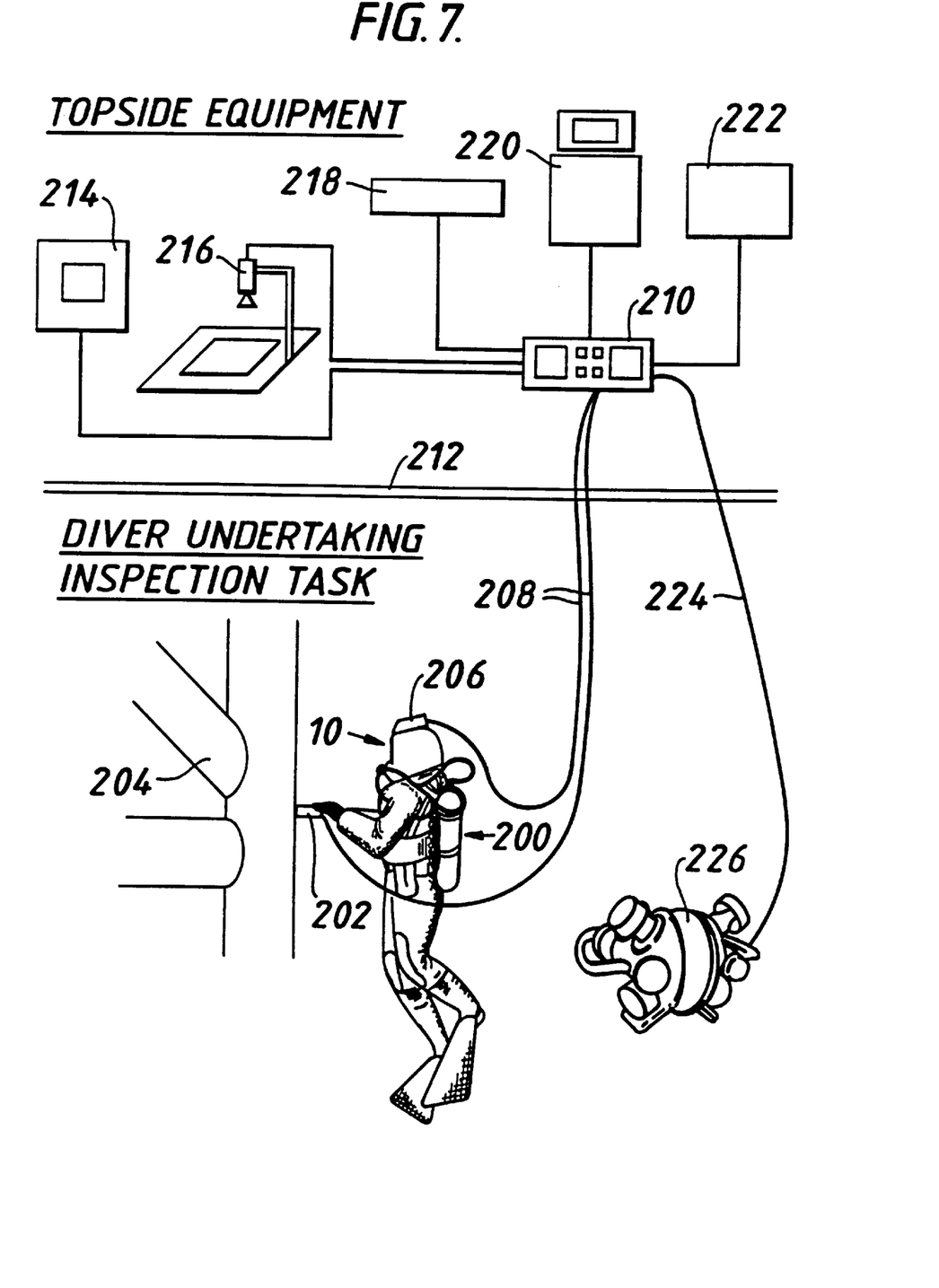
FIG. 7 is a schematic view of a diver located subsea wearing equipment according to the invention and showing topside various items used in a practical system according to the invention.

FIG. 7 shows the equipment in use. A diver 200 located subsea wears a helmet according to the invention and manipulates a non-destructive testing device, such as an inspection probe 202 by means of which he inspects the nodes of an underwater structure 204, such as an oil platform for example.

The probe 202 and the television camera and monitor at 206 on the helmet 10 are connected by cables 208 to a control unit 210 located topside on a diver support vessel (not shown) at the surface 212 of the sea, or on an oil or gas platform, for example, on or above the surface.

The control unit 210 is shown connected to an inspection probe display 214; a video camera 216; an image processing and/or an image enhancement package 218; a CAD/CAM package 220; and a virtual reality package 222.

The control unit 210 is also connected by a cable 224 to a remotely operated vehicle 226.

Typically, the diver 200 receives a display which is what the television camera 206 sees and which is visible to the diver through his eyepiece 18. This display is very useful to ensure that a satisfactory video record of any task is made and also when the visibility subsea is rather poor, as is sometimes the case. Optionally, the operative located topside who is monitoring the diver's operations can improve the display using the package 218 to process the raw video image from the camera 206 and/or enhance the image, so improving the display eventually sent to the diver via his helmet mounted display means described above.

Optionally, the operative can send to the diver the raw data from the probe 202, or an improved or enhanced version of it. Alternatively, the operative can send a picture of a diagram or chart or another graphical image, via the video camera 216, to the diver to assist him in performing his task.

Alternatively, the diver manipulates an undersea television camera, or there is a television camera available subsea which observes the diver or the task confronting him. Images from such cameras are viewed by the diver on his display or else the images are sent topside for treatment such as image processing or enhancements. Data or images from other divers or from the remotely operated vehicle may be passed topside and then passed to the diver 200. Sensors may be placed on the diver 200 and in and around the subsea worksite which give positional information relating to the diver 200. This information can be transmitted topside and allows data to be sent to the diver 200 concerning his location and orientation. This information may be used to create a virtual reality display which is passed to the diver 200 via his display means.

FIG. 7 omits other necessary features for clarity including electric power supplies for the camera and monitor at 206, the camera 216, and the display 214 and packages 218, 220 and 222 as well as the control unit 210 and for the probe 202.

In modifications (not shown) the means shown as a monitor 60 may be replaced by other video image display devices, such as for example liquid crystal display, gas plasma, back-projection or electro-luminescent panel devices for transmission of black and white or coloured images. The monitor 60 described above produces black and white images but in modifications (not shown) monitors producing coloured images can be used.

We claim:

1. Diver communication equipment comprising:
   a diver's helmet having a faceplate and display means carried by the helmet, said display means including
   (a) imaging means by which an image can be created in response to an electronic input including a video input,
   (b) an optical system for viewing said image, said optical system including an eyepiece and optical means for magnifying said image, and
   (c) locating means locating at least part of said imaging means outside of said helmet and said eyepiece within said helmet behind said faceplate,
   wherein said eyepiece has an output axis which is inclined to a vertical plane, and
   wherein said optical system is effective to focus said image or an intermediate version thereof for a diverted eye of a diver.

2. Equipment according to claim 1, said helmet having a through-aperture and being provided with seal means at said aperture, said locating means being a tube extending into the interior of said helmet, said seal means being in sealing relationship with said helmet and with said tube, said imaging means comprising a monitor mounted on said helmet in a horizontal, or near-horizontal position, and said optical system includes prism means by which light is deflected from an axis defined in a first direction by said monitor to an axis defined in a second direction by a relay lens system contained in said tube between said prism means and said eyepiece, said monitor, said prism means, and said relay lens system being housed in a pressure-resistant housing, part of which is formed by said tube and which housing is closed at one end by said eyepiece.

3. Equipment according to claim 2, wherein the position of said tube in said aperture is adjustable in the lengthwise direction of said tube to position said eyepiece to suit a diver wearing said helmet, and wherein said tube is lockable in whatever position to which it is adjusted.

4. Equipment according to claim 1, said helmet having a through-aperture and being provided with seal means at said aperture, said locating means being a tube extending into the interior of said helmet, said seal means being in sealing relationship with said helmet and with said tube, said means comprising a monitor and being contained in said tube which together with said eyepiece form a pressure-resistant housing.

5. Equipment according to claim 4, wherein said eyepiece includes lens means to complete said optical system.

6. Equipment according to claim 1, wherein said locating means extends into the interior of the helmet in a downward direction from above the eye and said diverted eye is an upwardly diverted eye.

7. Equipment according to claim 1, wherein said eyepiece is of the retro-reflecting type.

8. Equipment according to claim 1, wherein said locating means comprises a tube which is closed at its end within the helmet by a transparent first part to which said eyepiece is secured, wherein said eyepiece is made up of a first transparent eyepiece part secured at a first face to said transparent first part and secured to a second transparent eyepiece part, wherein said eyepiece parts are secured together at an interface which is angled to said output axis, and wherein said first eyepiece part has a mirrored convex face which is symmetrical with respect to said output axis.

9. Equipment according to claim 1, wherein said helmet carries a television camera and a light.

10. Equipment according to claim 1, wherein said helmet carries a television camera and a light when worn by a diver located subsea, and wherein the output from said television camera is connected to said monitor through switch means located topside.

11. Equipment according to claim 1, further comprising a television camera for manipulation by a diver located subsea and means for connecting the output from said television camera to said monitor through switch means located topside.

12. Equipment according to claim 1, further comprising a device for manipulation by a diver located subsea and/or a remotely operated vehicle located subsea, and means for passing information from said device or said vehicle to a control unit located topside and then relayed to said diver.

13. Equipment according to claim 1, further comprising means for conveying information to a diver located subsea via said display means from equipment located topside, said information being created from raw information received from subsea or being created from topside sources.

14. Equipment according to claim 13, wherein said information passed to said diver includes output from a television camera located topside or output from a control unit using image processing or image enhancement processes or using CAD/CAM or virtual reality processes.

15. Diver communication equipment comprising:

a diver's helmet having a faceplate and display means carried by the helmet, said display means including
(a) video imaging means by which an image can be created in response to an electronic input, and
(b) an optical system for viewing said image, said optical system including an eyepiece in a pressure resistant housing together with the video imaging means, and
(c) locating means locating at least part of said pressure resistant housing outside of said helmet and another part of said pressure resistant housing including said eyepiece within said helmet behind said faceplate, wherein said eyepiece has an output axis which is inclined to a vertical plane, and wherein said optical system is effective to focus said image or an intermediate version thereof for a diverted eye of a diver.

16. Equipment according to claim 15, said helmet having a through-aperture and being provided with seal means at said aperture, said locating means comprising a tube forming at least part of said pressure resistant housing and extending through said aperture into the interior of said helmet.

17. Equipment according to claim 16 wherein the tube is slidable to adjust the position of said eyepiece for viewing.

18. Equipment according to claim 17 further comprising locking means for holding the tube in a selected position.

19. Equipment according to claim 15 wherein said optical system further comprises optical means within said pressure resistant housing for magnifying said image.

20. Equipment according to claim 15 further comprising means topside for enhancing said image prior to creation of the image by the video imaging means.

21. Equipment according to claim 15 wherein said image comprises a virtual reality image and wherein said equipment further comprises means topside for generating said virtual reality image.

* * * * *